US006778821B1

(12) United States Patent
Shunk

(10) Patent No.: US 6,778,821 B1
(45) Date of Patent: Aug. 17, 2004

(54) UNIVERSAL SERVICE ACTIVATION PLATFORM

(75) Inventor: Christopher J. Shunk, Easton, PA (US)

(73) Assignee: Cellco Partnership, Bedminster, NJ (US)

( * ) Notice: Subject to any disclaimer, the term of this patent is extended or adjusted under 35 U.S.C. 154(b) by 460 days.

(21) Appl. No.: 09/702,694

(22) Filed: Nov. 1, 2000

(51) Int. Cl.[7] .......................... H04M 3/42; H04B 7/00
(52) U.S. Cl. .................. 455/419; 455/414.1; 455/507; 379/15.03; 379/201.03; 379/201.12
(58) Field of Search ................................ 455/418, 419, 455/517, 414.1, 456.1, 456.5, 507, 67.11, 445, 408, 423; 379/15.03, 201.02, 201.01, 201.03, 201.12, 221.08, 9, 229, 10.03, 352, 230, 220.01, 219, 93.12, 15.02, 114.15, 114.28; 705/26; 370/467, 401, 352, 466; 709/218, 219, 217

(56) References Cited

U.S. PATENT DOCUMENTS

| | | | |
|---|---|---|---|
| 5,870,667 A | | 2/1999 | Globuschutz ............... 455/419 |
| 5,915,008 A | | 6/1999 | Dulman .................. 379/221.08 |
| 5,953,389 A | | 9/1999 | Pruett et al. .............. 379/15.02 |
| 5,958,016 A | | 9/1999 | Chang et al. ................ 709/229 |
| 6,104,796 A | * | 8/2000 | Kasrai .................... 379/201.12 |
| 6,104,798 A | * | 8/2000 | Lickiss et al. .......... 379/201.12 |
| 6,243,451 B1 | * | 6/2001 | Shah et al. ............. 379/201.03 |
| 6,304,647 B1 | * | 10/2001 | Frost ...................... 379/201.12 |
| 6,393,408 B1 | * | 5/2002 | Mosher et al. ................. 705/28 |
| 6,499,017 B1 | * | 12/2002 | Feibelman et al. ............. 705/8 |
| 2003/0100290 A1 | * | 5/2003 | McGregor et al. .......... 455/410 |

* cited by examiner

Primary Examiner—Marsha D. Banks-Harold
Assistant Examiner—Rafael Perez-Gutierrez
(74) Attorney, Agent, or Firm—McDermott Will & Emery LLP

(57) ABSTRACT

A computer application having a common front-end interface and a back-end interface is used to activate and provision communication services provided by multiple carriers. The common front-end interface communicates with at least a database. The back-end interface is configured to communicate with every provisioning system for every carrier that a reseller of communication services has arrangements with. The back-end interface also performs the necessary translations and data conversions that are needed to utilize information from the front-end interface to activate and provision features for communication services on a particular carrier's provisioning system.

25 Claims, 4 Drawing Sheets

# UNIVERSAL SERVICE ACTIVATION PLATFORM

FIELD OF THE INVENTION

The inventive concepts relate to resale of communication services, particularly pertaining to provisioning techniques for reselling such services.

DESCRIPTION OF RELATED ART

Telecommunication services are offered to customers by companies that may not actually own and operate a single telecommunications network. This is performed by reselling telecommunication services provided by established telecommunications companies. However, reselling telecommunication services is not an easy task as it involves coordinating and integrating information from various telecommunications companies into the reseller's business systems.

Reselling telecommunication services, particularly reselling cellular communication services, is administratively complex. Resellers of cellular communication services often desire to offer their customers cellular service throughout an expansive geographic area. However, the companies that physically provide cellular communication services (carriers) have geographically limited areas in which they can provide cellular communication services. For this reason, resellers of cellular communication services require a multitude of arrangements with different carriers in order to offer their customers cellular service throughout an expansive geographic area. An arrangement between a carrier and a reseller typically involves the carrier assigning a range of cellular telephone numbers, from the pool of numbers available through the carrier's network, for the reseller to administer for the reseller's customers. The carrier may also provide the reseller with some form of data-link access to the carrier's provisioning system. so that the reseller can activate telephone numbers and provision features for telephone numbers on behalf of the reseller's customers.

Each carrier that a reseller makes an arrangement with offers general service activation and a variety of features for its cellular communication services that a reseller can offer to its customers. Often, the particular features available for cellular communication services vary from carrier to carrier. Also, each carrier has its own independent provisioning system, and sometimes more than one unique system, for activating service and provisioning features for its cellular communication services. Because a reseller typically makes arrangements with multiple carriers, a reseller must know the required data for, and how to operate, a multitude of provisioning systems, as well as variations due to differences in available features. Administratively, this is a complex problem that resellers face.

Representatives for a carrier are required to fluently know how to operate the carrier's provisioning system so that customers receive fast, accurate and reliable service. Each provisioning system is designed to operate with a specific carrier's cellular network and has a unique set of parameters that it requires, to perform activation and provisioning of features for a mobile telephone number. The required parameters vary depending upon what action the provisioning system is performing. For example, the required parameters for activation might include a customer's name, address, billing information, and mobile identification number for the customer's cellular telephone, while provisioning a feature such as call waiting might require only the mobile identification number for a customer's cellular telephone and the customer's account number. Often a carrier has multiple networks, each with its own provisioning system. Typically a carrier handles multiple cellular networks and multiple provisioning systems by training some representatives to operate one of the provisioning systems and other representatives to operate other provisioning systems.

Representatives for a reseller of cellular communication services are also required to fluently know how to operate provisioning systems so that the reseller's customers receive fast, accurate and reliable service. However, a reseller does not operate two or three provisioning systems. A reseller may be required to interface with fifteen or more provisioning systems, depending upon how many carriers the reseller has arrangements with and how many distinct provisioning systems each carrier operates. Each provisioning system is accessed through a separate computer application and requires unique information and knowledge for operation. This means that a reseller must have representatives capable of operating each provisioning system, and training courses established to train representatives on each of the provisioning systems. A typical representative can learn how to fluently operate at most two or three provisioning systems because operation of a provisioning system requires a representative to learn a new computer application and the unique information that application requires. Establishing training courses, training representatives, providing support for multiple computer applications, and the number of representatives required to operate all of the provisioning systems that a reseller must operate is costly.

Another significant problem for resellers is that there is too much information relating to activating and provisioning telephone numbers on all of the different carriers' provisioning systems for a reseller to establish a single service center. Reseller representatives must identify each incoming call relating to a provisioning operation with a particular carrier. Often, this is done by having representatives memorize ranges of telephone numbers that belong to each carrier the reseller has arrangements with.

This task is easier for representatives if at least some of the possible carriers are eliminated by having different service centers that serve different service regions. For example, a reseller offering cellular services throughout the United States might have a service center in the North East, one in the South, one located in the Midwest, and one on the West Coast.

Separate service centers are also needed because of the equipment required to operate all of the different provisioning systems. Within a service center different workstations are configured with different applications that operate unique provisioning systems. For example, one representative's workstation might run two applications, one for each of the provisioning systems that the representative is trained to operate, while the workstation for the representative next to him could run three completely different applications, one for each provisioning system that she is trained to operate. This results in various workstation configurations and different networks within a single service center that are necessary to physically communicate with and operate the multiple applications for provisioning systems to which the service center interfaces. From a technical standpoint, resellers must limit the variation of workstation configurations and networks within a service center in order to maintain and administer the computer resources for a service center.

Yet another problem is lack of synergy between reseller representatives' job duties. Because of the complex nature of provisioning systems and the separate computer applications required to operate each provisioning system, each reseller representative knows how to operate only a few different applications for a few provisioning systems. This means that a limited number of reseller representatives know how to operate the application for a provisioning system for each particular carrier. Therefore, reseller representatives cannot be transferred from one service center to another because the applications for provisioning systems are different in each service center. It also means that if only a handful of representatives were to become ill, or quit, or otherwise become-indisposed, the reseller could be left without any employees that know how to operate one, or.several of the applications for provisioning systems in a service center.

A configuration for a reseller's service center is schematically depicted in FIG. 1. A reseller of cellular communication services operates its own cellular network 109. Although shown, a reseller of cellular communication services might not own its own cellular network and would only resell cellular services provided by other carriers. The reseller operates a computer system 102 that runs an application (not shown) that interfaces with the reseller's provisioning system. The application on the computer system 102 communicates with the provisioning system 105 having a provisioning server 103 and a provisioning database 104. Although shown in its own service center 101, the computer system 102 could be included in other services centers such as service center 100 for example.

The application on the computer system 102 and the provisioning database 104 is used to activate telephone numbers and provision service features in association therewith, for the reseller's cellular network 109. Essentially, the computer system 102 uses the application and the provisioning database 104 to communicate with the mobile switching center 106 (MSC) and/or the base station controllers 108 (BSC) to provide information regarding activation of new telephone numbers and addition or subtraction of features, such as caller identification or an answering service, for example, for mobile station A, identified with an existing telephone number.

The reseller also operates a service center 100. For simplicity, FIG. 1 depicts the reseller having connections with only two carriers for the service center 100, but multiple connections for multiple carriers typically enter a service center. Within the service center the reseller operates two separate computer systems, 110 and 120. The computer system 110 runs an application for performing activation and provisioning on Carrier I's cellular network 117, i.e., for cellular telephone B. The computer system 120 runs a different application for performing activation and provisioning on Carrier II's cellular network 127, i.e., cellular telephone C. Cellular telephone D illustrates that Carrier II administers cellular telephones on the same cellular network 127 that the reseller utilizes. Although not shown, Carrier I also administers telephones on its cellular network 117. The physical structure for cellular networks 109, 117, and 127 are similar, although the physical communication connections may differ, and activation and provisioning occur through the same process of information transmitted from a computer system 102, 110, or 120 to an MSC and/or BSCs. However, activation and provisioning are not the same for the cellular networks 109, 117, and 127. The major difference for activating and provisioning telephone numbers on the different cellular networks 109, 117, and 127 is the different applications that are run on the computer systems 102, 110, and 120, the different features available on each cellular network 109, 117, and 127, and the different parameter set required by each provisioning system 105, 113, and 123. Reseller representatives must know the geographic areas and what telephone numbers correspond to which carriers, how to operate each of the separate applications for each provisioning system, and what data to supply to the various provisioning systems 105, 113, and 123 in order to fulfill the required parameters needed by a particular provisioning system 105, 113, or 123 to perform activation of a telephone number and provisioning of features for a telephone number.

For example, three different customers having three different cellular telephones, cellular telephone A served by cellular network 109, cellular telephone B served by cellular network 117, and cellular telephone C served by cellular network 127, call to ask for caller identification to be added to their cellular communication service. To start, reseller representatives must associate each existing customer's telephone number with the correct carrier's cellular network, i.e., cellular telephone A with network 109, cellular telephone B with network 117, and cellular telephone C with network 127. Then, representatives must know how to operate the computer application for each provisioning system and the required parameter set relating to caller identification for each provisioning system. The representatives then supply the necessary data to fill the required parameter set for each provisioning system. This means that provisioning system 105 requires certain information in order to establish caller identification for the telephone number related to cellular telephone A, that provisioning system 113 requires different information in order to establish caller identification for the telephone number related to cellular telephone B, that provisioning system 123 requires yet different information in order to establish caller identification for the telephone number related to cellular telephone C, and that reseller representatives must know the information required by each provisioning system.

Having a separate workstation and a separate application for each provisioning system is problematic and inefficient for a reseller. Along with the problems noted above, inefficiencies arise from having multiple service centers, such as owning duplicate buildings that serve the same purpose. Inefficiencies also arise from having reseller representatives who know only a few provisioning systems out of many. For example, in a business day a service center might receive many customer calls relating to provisioning, but none of the calls are for provisioning systems for carriers that an individual reseller representative knows how to operate. While the service center is busy, and many reseller representatives are busy, there would be at least one reseller representative who is idle because of the manner in which resale of cellular communication services is conducted.

SUMMARY OF THE INVENTION

For a reseller of cellular communication services or the like, there is a need to simplify activation and provisioning when reselling communication services provided by multiple carriers. There is also a need to synergize activation and provisioning of cellular telephone numbers for reseller representatives relating to multiple carriers' provisioning systems and the applications used to operate the provisioning systems.

These needs and others are met by embodiments of the present invention, which provide a computer application having a common front-end interface and a back-end interface pointing to specific provisioning systems, to activate and provision services through networks belonging to multiple carriers. The common front-end interface communicates with at least a database. The back-end interface is configured to communicate with every provisioning system for every carrier that a reseller of cellular communication services has arrangements with. The back-end interface also performs the necessary translations and data conversions to use information from the front-end interface to activate and provision features for a telephone number in a particular carrier's provisioning system.

Accordingly, an aspect of the present invention relates to a method for activating and provisioning telephone numbers belonging to multiple carriers utilizing a single front-end computer interface. This method comprises several steps, of which the first is receiving an activation or a provisioning request for a communications device into a common interface. Next, a telephone number is identified and associated with the communications device. Then, a determination is made concerning which carrier is associated with the identified telephone number. The next step is identifying a provisioning parameter set required by the carrier's provisioning system, and creating provisioning data relating to the action to be carried out by the provisioning system. Communications with the carrier's provisioning system are established, and the provisioning data is sent to the carrier's provisioning system to provision the telephone number.

Accordingly, another aspect of the present invention relates to a system configured to provision telephone numbers belonging to multiple communication service providers. The system comprises a computer, and a single front-end interface running on the computer that receives and displays information for provisioning telephone numbers. A database communicates with the single front-end interface. The database contains telephone numbers, and it identifies associated service regions for each telephone number as well as an associated carrier for each telephone number. The database stores sets of required provisioning parameters for each carrier's provisioning system. The system also comprises a plurality of configurations, each of which is adapted to enable communications with a distinct provisioning system. Scripts are executed by the computer. Each script communicates with the single front-end interface and the database. Each script is written to identify a required provisioning parameter set for a particular carrier's provisioning system, depending upon an activation request and/or the feature to be provisioned. Each script utilizes the single front-end interface, the database, and the set of required provisioning parameters for a particular carrier's provisioning system to create specific provisioning data for a telephone number. Each script also triggers provisioning for a telephone number utilizing one configuration adapted to enable communication with the particular provisioning system for a carrier.

Other advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the FIGS. of the accompanying drawings and in which like reference numerals refer to similar elements and in which.

DETAILED DESCRIPTION

A system and methodology for activating and provisioning cellular telephones on multiple cellular networks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the present invention allow a reseller representative to provision network services from various carriers' networks from a single common application. The inventive concepts clearly apply to other service resale situations. The primary examples discussed below focus on resale of mobile wireless service, for example, requiring provisioning in relation to cellular telephone numbers. By providing a front-end interface that is the same, regardless of the carrier for which a telephone number is being provisioned, the present invention eliminates the need for representatives of a reseller of cellular services to fluently know many different applications for different provisioning systems. In combination with the front-end common interface, the present invention provides a back-end interface that communicates with each carrier's provisioning system, or systems. The communication with various provisioning systems is not apparent to representatives of a reseller of cellular services, thus providing a seamless interface between the front-end application and each carrier's provisioning system.

Figure 1:
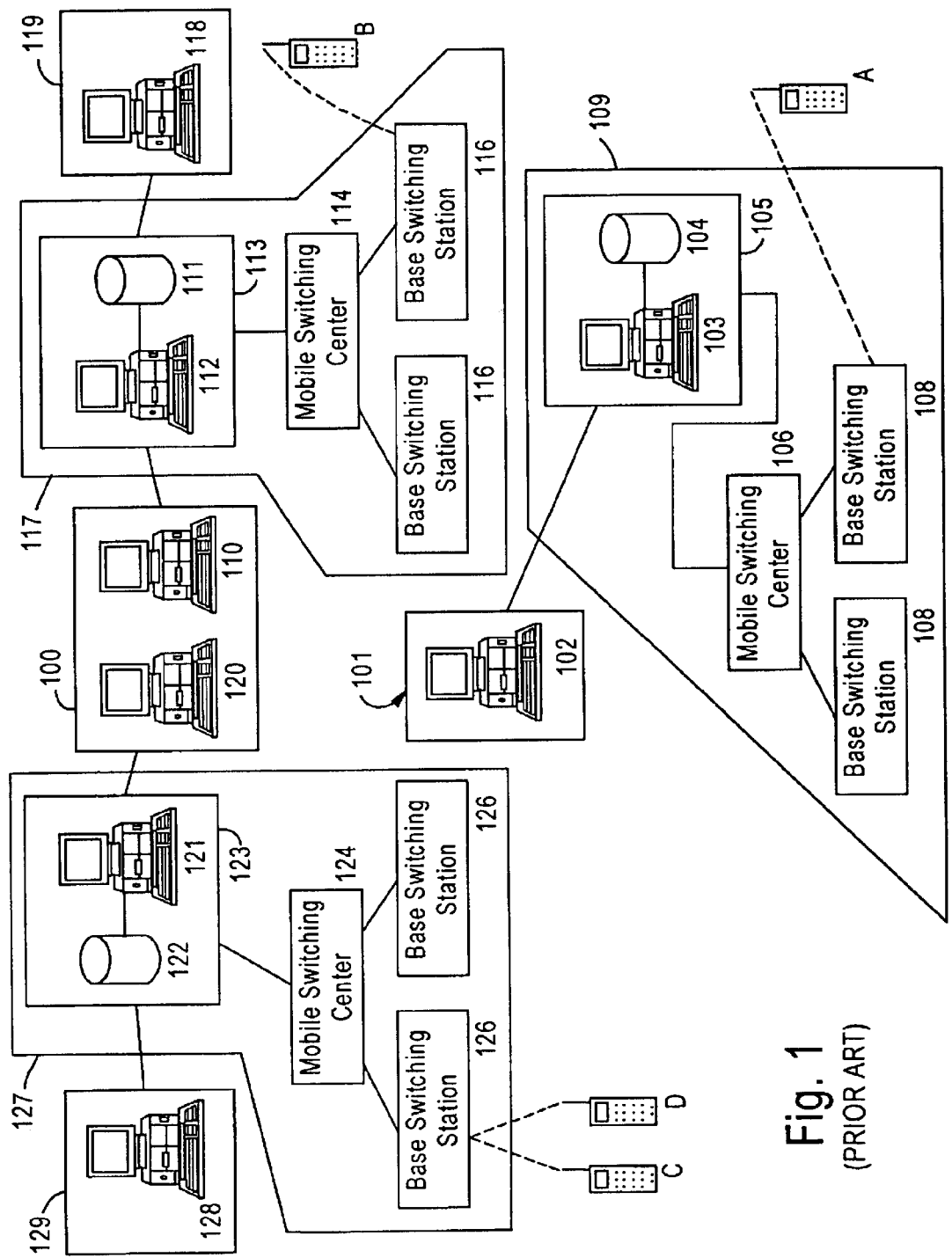
FIG. 1 depicts a current arrangement for a reseller of cellular communication services.
Figure 2:
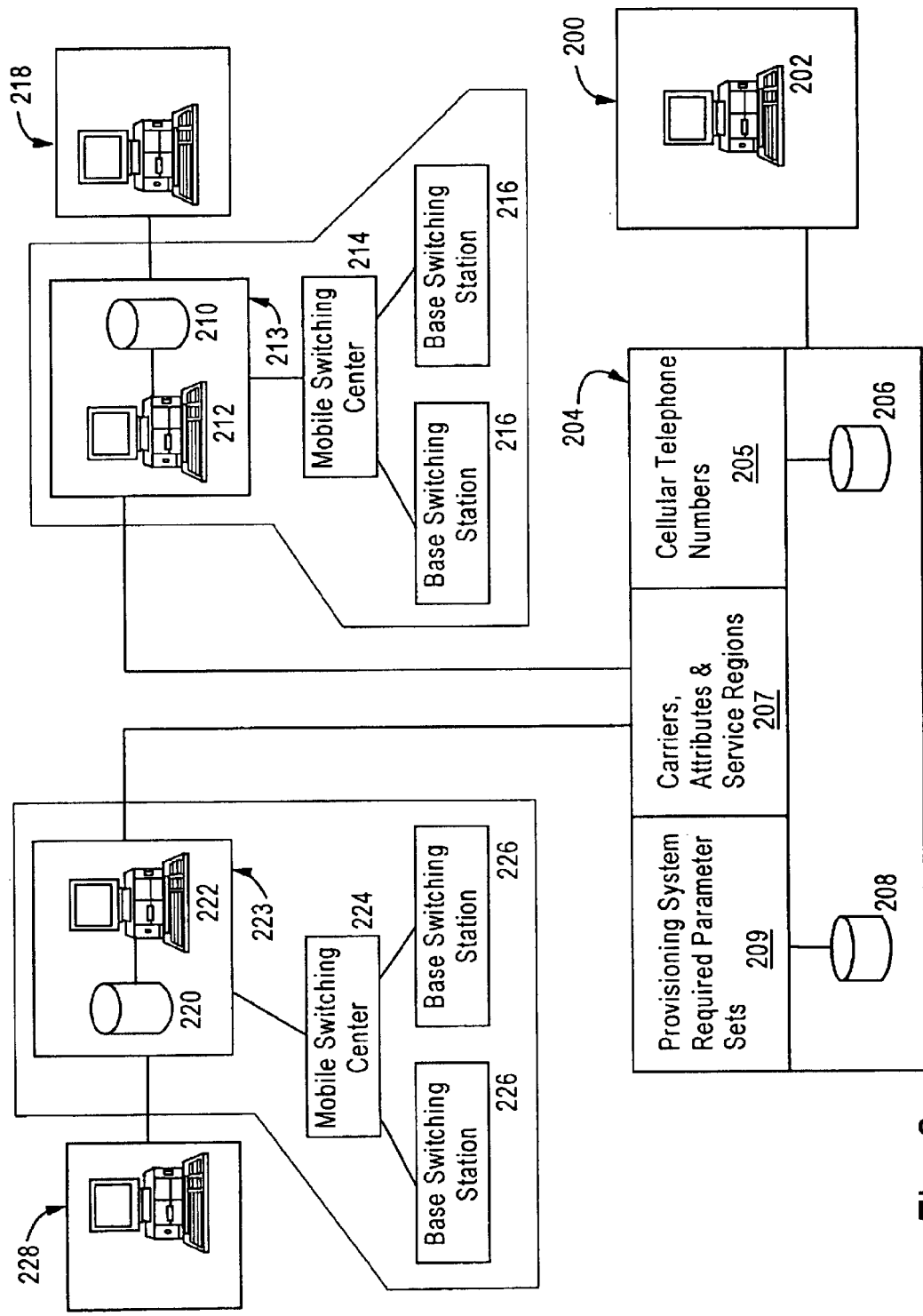
FIG. 2 depicts an arrangement for a reseller of cellular communication services according to an embodiment of the present invention.

Referring to FIG. 2, an exemplary embodiment of the present invention relating to activating and provisioning telephone numbers for multiple wireless carriers from a single interface is described.

For clarity, FIG. 2 depicts only portions of two networks belonging to two separate carriers communicating with a reseller's computer system 202 and database 204, however, other networks are capable of communicating with the computer system 202 and database 204. Each network has a provisioning system, 213 and 223, that activates new telephone numbers and provisions features for telephone numbers that belong to the carrier. For example, a provisioning system comprises a computer system 212, 222 and a provisioning database 210, 220. A provisioning database 210, 220 contains information relating to the activated services for each telephone number for all telephone numbers belonging to a carrier. The provisioning system, 213, 223, communicates with a business office, 218, 228 respectively, and/or with mobile switching centers 214, 224 and/or base switching stations 216, 226 when activating and/or provisioning telephone numbers. The computer system 212, 222 in a provisioning system 213, 223 interacts with the provisioning database 210, 220 to update the business office, 218, 228, and/or the mobile switching centers 214, 224 and/or base switching stations 216, 226 with information regarding activation and/or services for each telephone number. Normally, the telephone numbers belonging to a carrier are administered and billed by the carrier. However, when a reseller is selling a carrier's services, some of the telephone numbers owned by the carrier are administered by the reseller, and billing and provisioning information relating to those telephone numbers is forwarded from the carrier's business office, 218, 228 to the reseller's service center 200.

A reseller operates a service center 200 that contains a computer system 202. The computer system 202 runs an application (not shown) that serves as a common interface for reseller representatives to activate and provision telephone numbers on multiple provisioning systems belonging to multiple cellular carriers. The application has a front-end program that reseller representatives interact with, and a back-end that provides a seamless interface between the front-end and multiple provisioning systems of the actual carriers. An exemplary embodiment of the application will be described in detail later, with reference to FIG. 3. The computer system 202 communicates with a database system 204 that contains three tables, for example. One table, 205, in the database system 204 contains all of the cellular telephone numbers assigned to the reseller by the various carriers that the reseller has arrangements with to provide cellular communication services. Another table, 207, in the database system 204 contains attributes associated with each cellular telephone number, the identification of the carrier that owns a particular telephone number, and an identification of what service region a particular telephone number is in. In the database system 204, a link or a pointer, for example, associates each telephone number in the first table 205 with the carrier's identifier in the second table 207 that owns that particular telephone number.

A third table 209 contains required parameter sets for various actions on each provisioning system. In turn, a link or a pointer, for example, associates each carrier's identifier in the second table 207 with a required provisioning parameter set for each action in the third table 209. There are many actions that a provisioning system can perform, for example, activating a new telephone number or provisioning a feature such as call waiting for an active telephone number.

The database system 204 communicates with other databases such as database 206 that contains mobile identification numbers (MINs) for mobile stations served by the reseller, and database 208 that contains provisioning protocols for each provisioning system. For example, a MIN database 206 can communicate directly with a telephone number table 205 and a protocol database 208 can communicate directly with a required parameter set table 209. The above is an example, and it is recognized that other arrangements and data can be used for practicing the present invention.

It is readily apparent from the description of the present invention that various database arrangements can be used to store the information in databases 204, 206 and 208. For example, information contained in the database 204 can be stored in separate columns of the same table or in completely different tables. Flat databases, relational databases, multi-dimensional databases, or other data storage arrangements could be used. It is also apparent that the information stored in the databases 204, 206, and 208 is not limited to storage in three databases, but could be contained on one database or multiple databases. Although shown separate from the computer system 202, the databases 204, 206, and 208 may reside on the computer system 202, depending upon the configuration of the computer system 202 and the databases 204, 206, and 208.

The computer system 202 also contains configurations (not shown) for enabling communication with each provisioning system. These configurations could be hardware such as a data cable and a communication port connected to the computer system 202, software programmed to communicate with a provisioning system, or a combination of hardware and software. The system 202 contains a configuration to enable communications with each of the provisioning systems that a cellular communication services reseller must operate, 213, 223 in FIG. 2. In other words, there is a one-to-one correspondence between the number of provisioning systems and the number of configurations. In other embodiments, the computer system 202 contains one configuration that enables communication with multiple provisioning systems. This could be accomplished, for example, using a configuration enabled to communicate with an internet protocol network which in turn communicates with separate provisioning systems. A large number of provisioning systems can communicate with the computer system 202 through one, or a number of communications configurations residing on the computer system 202, however, only two are depicted for simplicity and clarity.

Referring to FIG. 2 an exemplary method for activation of a cellular telephone number is performed in the following manner. A representative for a reseller of communication services at service center 200 receives a call from a customer who wants to activate a new cellular device. The representative receiving the call from the customer enters information such as the customer's zip code, or other geographic indicating information, into the front-end interface of the application running on the computer system 202. After receiving the geographic information from the reseller representative, the application uses the customer's geographic information to identify the service region that the customer is in, and identifies an available cellular telephone number that belongs to the carrier that provides cellular communication services for the reseller in the region the customer is in. Alternatively, the application could identify a cellular telephone number that is pre-designated for the service region that the customer is in, and then identify which cellular carrier owns the telephone number selected for the customer. The identified carrier will serve as the home service provider for the customer, under the arrangement with the reseller.

At this point, the front-end interface prompts the reseller representative to enter comprehensive information containing data used by all of the various provisioning systems. This is necessary to make needed data available to the as-yet unidentified provisioning system. Alternatively, the back-end interface uses the carrier's identification information and the service region the customer is in to identify the provisioning system that will be used to activate the telephone number. The back-end interface then retrieves the required parameter set for performing a specific action, here activation of a cellular telephone number, by the identified provisioning system. A parameter set identifies fields of data that are needed, e.g., a parameter set for activation could include fields for the customer's first name, the customer's last name, the customer's address, the type of service the customer ordered, a pricing plan, etc. Once the required parameter set has been identified the back-end interface transmits the required parameter set to the front-end interface which prompts the reseller representative to enter the necessary data to fill the parameters. The form of the presentation to the representative is defined by the common user interface of the application running on the computer 202. After data has been entered, the front-end interface transmits the identified cellular telephone number and the data to the back-end interface.

Using the data supplied by the reseller representative, the back-end interface formats the data into provisioning data required for the identified provisioning system. The back-end interface then communicates with a configuration adapted to enable communications with the identified provisioning system. The configuration could be communication hardware specifically for communicating with the identified provisioning system, software written to enable communication with the identified provisioning system, or a combination of hardware and software. The back-end interface of the application transmits the identified cellular telephone number and the provisioning data to the configuration, which then establishes communication with the identified provisioning system 213 or 223. The configuration then transmits the identified cellular telephone number and the provisioning data to the identified provisioning system.

The data received at the carrier's system contains appropriate data and is in a format as if prepared and sent from one of the carrier's own dedicated provisioning terminals 212 or 222. When the carrier's provisioning system receives the identified telephone number and the provisioning data, information is transmitted to the carrier's business office 218 or 228, and to a mobile switching center 214 or 224, to activate the telephone number. After the new telephone number has been activated by the carrier's provisioning system, a signal is sent back to the reseller indicating the telephone number is now active.

An exemplary method of provisioning a feature for an active telephone number is now described making reference to FIG. 2. A representative for a reseller of communication services receives a call from a customer who wants new features for a cellular device that has an active cellular telephone number. The representative receiving the call from the customer enters the active cellular telephone number and the new features desired into the front-end interface of the application running on the computer system 202. After receiving the customer's active cellular telephone number, the application uses the customer's cellular telephone number to identify the customer's account and service region, and to identify the carrier that provides home cellular communication services for the active cellular telephone number, and thus for the customer. Upon identifying the associated cellular carrier, the application communicates with the back-end interface.

The back-end interface identifies the provisioning system that will be used to provision the new features for the telephone number, using the carrier's identification and the service region. The back-end interface then retrieves the required parameter set for performing a specific action, here provisioning, by the identified provisioning system. The parameter set identifies fields of data that are needed, e.g., a parameter set for provisioning a feature such as an answering service could include fields for the customer's first name, the customer's last name, the customer's account, the customer's cellular telephone number, the make and model of the customer's cellular device, how many messages can be stored, etc. Once the required parameter set has been identified, the back-end interface transmits the required parameter set to the front-end interface which prompts the reseller representative to enter any additional data that may be necessary to fill the parameters.

Using the data supplied by the reseller representative, the back-end interface formats the input parameter data into provisioning data for the identified provisioning system. The back-end interface then communicates with a configuration adapted to enable communications with the identified provisioning system. The configuration could be communication hardware specifically for communicating with the identified provisioning system, software written to enable communication with the identified provisioning system, or a combination of hardware and software. The back-end interface of the application transmits the provisioning data to the configuration, which then establishes communication with the identified provisioning system. The configuration then transmits the provisioning data to the identified provisioning system.

When the carrier's provisioning system receives the provisioning data, information is transmitted to the carrier's business office and to a mobile switching center to provision the new features for the telephone number. The customer can now use the new feature from the carrier's network. In many cases, the carrier will provision feature data in the home location register assigned to the customer. This data may be forwarded to other carriers' networks to allow the customer to use the same feature, if available, while roaming. After the new features have been provisioned by the carrier's provisioning system, a signal is sent back to the reseller indicating the features are now active.

Hardware Overview

Figure 3:
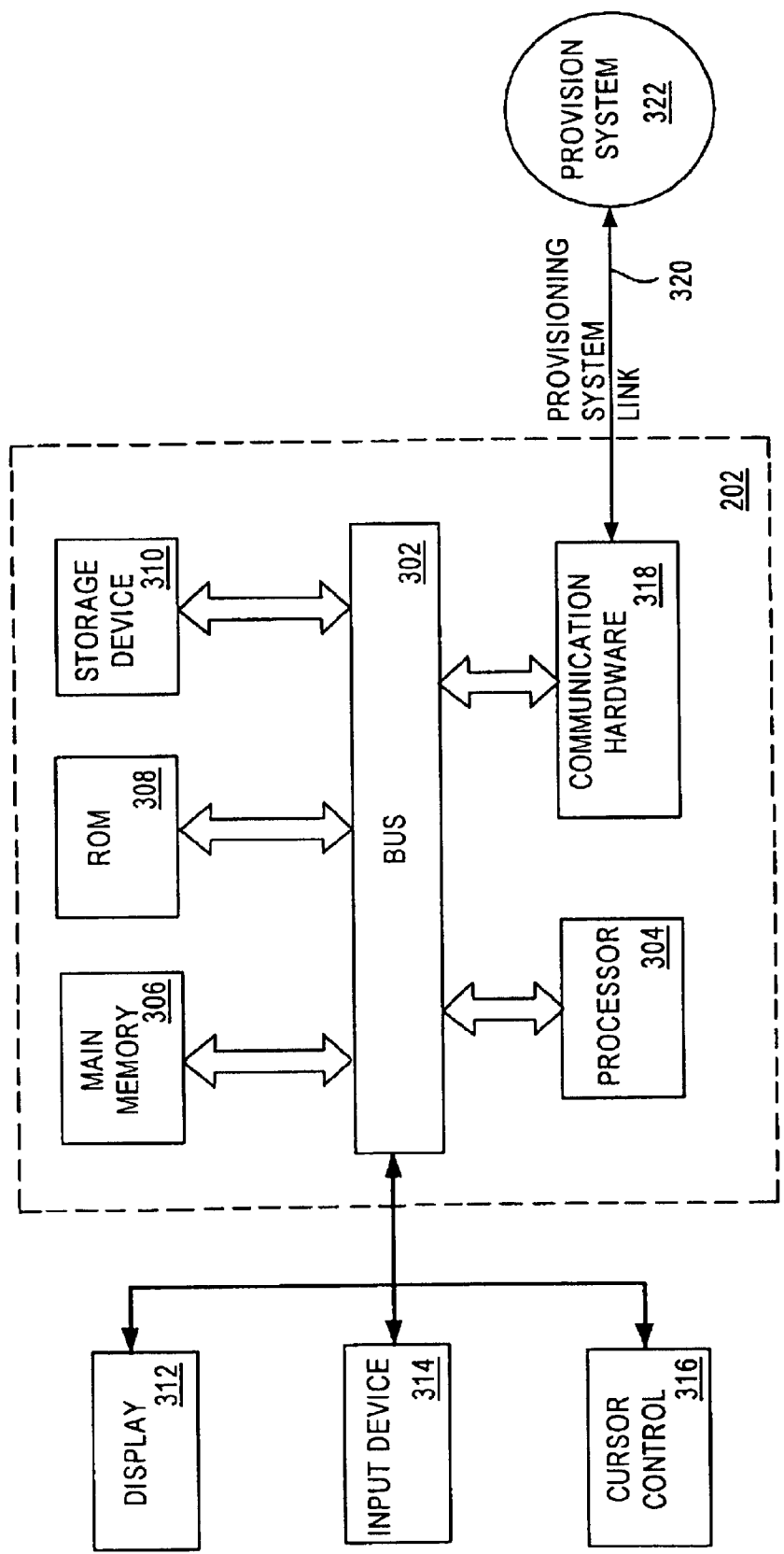
FIG. 3 depicts a computer system used in the arrangement of FIG. 2 to run an application that provides a single interface to multiple provisioning systems according to an embodiment of the present invention.

FIG. 3 is a block diagram that illustrates a computer system 202, depicted within a reseller's customer service center 200 in FIG. 2, upon which an embodiment of the invention may be implemented. The system may be a single unit or may be a distributed system. The computer system 202 may communicate with a separate database system 204, as in FIG. 2, or the hardware platform of system 202 may run the software to the databases of system 204.

Computer system 202 includes a bus 302 or other internal communication mechanism for communicating information, and a processor 304 coupled with bus 302 for processing information. Computer system 202 also includes a main memory 306, such as a random access memory (RAM) or other dynamic storage device, coupled to bus 302 for storing information and instructions to be executed by processor 304. Main memory 306 also may be used for storing temporary variables or other intermediate information, such as data input by a reseller representative, during execution of instructions to be executed by processor 304. Computer system 202 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 202 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 202 for providing a single application to interface with multiple provisioning systems. According to certain embodiments of the invention, communication between a single application and multiple provisioning systems is provided by computer system 202 in response to processor 304 executing one or more sequences of one or more instructions contained in main memory 306. For example, instructions are in the form of scripts written to identify parameter sets required by a specific provisioning system and to format data for a specific provisioning system. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media include, for example, optical or magnetic disks, such as storage device 310. Volatile media include dynamic memory, such as main memory 306. Transmission media include coaxial cables, copper wire and fiber optics, including the wires that comprise bus 302. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM. a FLASH-EPROM, any other memory chip or cartridge, a carrier wave as described hereinafter, or other media from which a computer can read.

Various forms of computer readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 202 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 202 also includes at least one implementation of communication hardware 318 coupled to bus 302. While only one implementation of communication hardware 318 is depicted, other communication hardware, either similar to or different from the implementation of communication hardware 318, are included in computer system 202. Communication hardware 318 provides a two-way data communication coupling to a provisioning system link 320 that is connected to, or is otherwise in communication with, a provisioning system 322 (for example, corresponding to 213 from FIG. 2). If there are multiple communication hardware configurations 318, then there will be a provisioning system link 320 for each communication hardware configuration 318. For example, communication hardware 318 may be an integrated services digital network (ISDN) card or a modem to provide a data communication connection to a corresponding type of telephone line. The link 320 then could extend through the telephone network. As another example, communication hardware 318 may be a local area network (LAN) card to provide a data communication connection to a compatible LAN and/or to a wide area network serving as the link 320. Wireless links may also be implemented. All, or a portion, of the link 320 could extend through the Internet, with appropriate security arrangements. Software may also be written to enable communication between the one or more sequences of one or more instructions contained in main memory 306 and the communication hardware 318. In any such implementation, communication hardware 318, often in conjunction with communication software, not shown, sends and receives electrical, electromagnetic or optical signals that carry digital data streams representing various types of information.

Provisioning system link 320 typically provides data communication either directly to a provisioning system or to a network that a provisioning system is connected to. For example, provisioning system link 320 may provide a direct connection to provisioning system 322, or to a LAN (not shown) that a provisioning system 322 communicates with. The provisioning system 322 in turn provides data communication with the carrier's business office, and provides data communication with the carrier's cellular network, i.e., the MSC and BSCs. The signals through the various networks and the signals on provisioning system link 320 and through communication hardware 318, which carry the digital data to and from computer system 202, are exemplary forms of carrier wave type media for transporting the information.

Computer system 202 can send and receive data, including program code, through the network(s), provisioning system link 320, and communication hardware 318. In accordance with the invention, one such data application provides for data transmissions between the computer system 202 and a provisioning system 322.

The data transmitted through communication hardware 318 is utilized by provisioning system 322 to activate and/or provision features for cellular telephone numbers. System 202 may have multiple communication hardware elements 318, and/or corresponding communication software, and corresponding provisioning system links 320 for each specific communication hardware 318. Alternatively, the system may have one communication hardware element 318, linked to a common network, and use differing software packages to communicate with other systems. In this manner, computer system 202 communicates with various provisioning systems through multiple communication configurations.

The present invention may be embodied in a computer system as described above, or it may be a program designed to operate on any configuration for a computer system.

Figure 4:
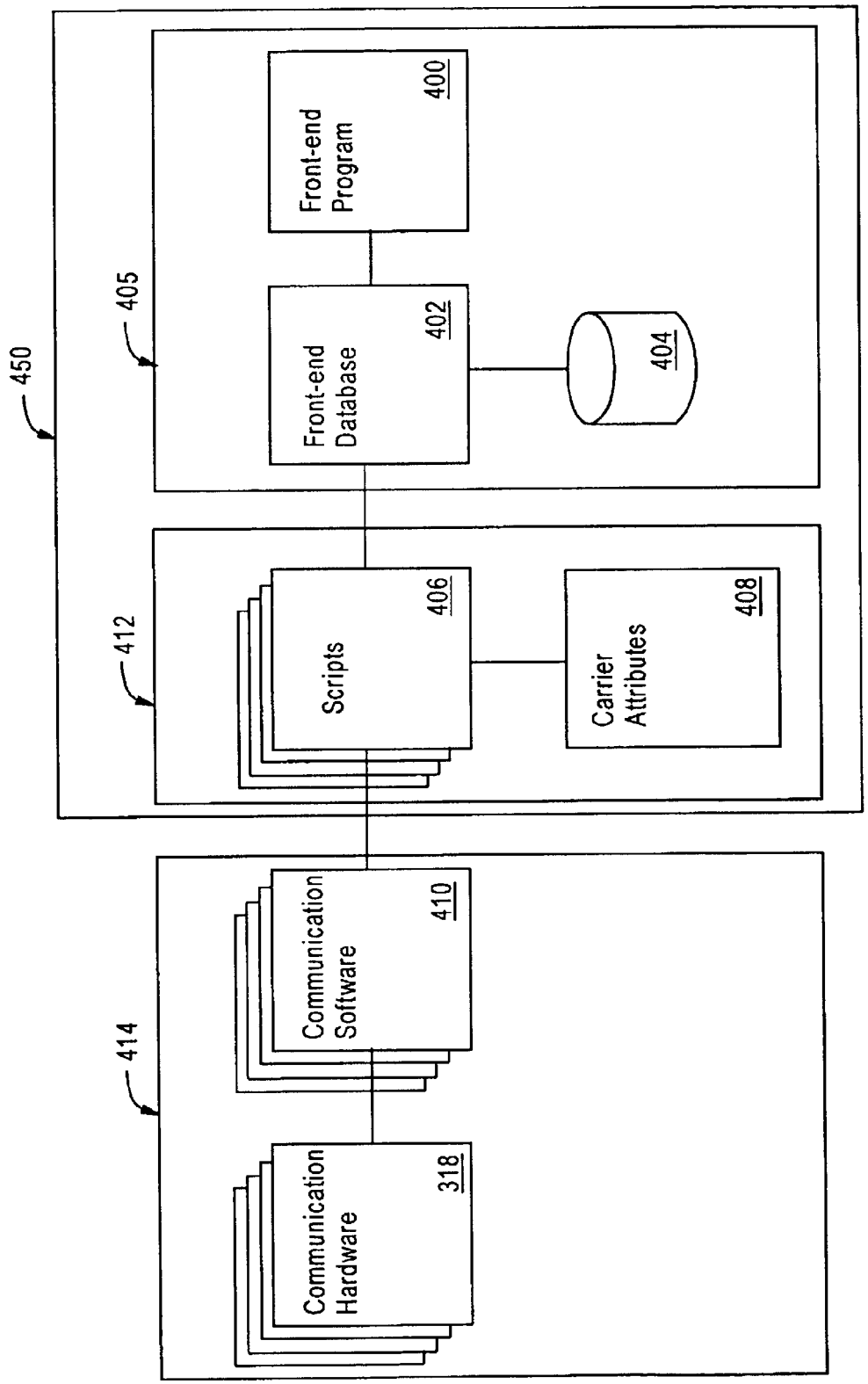
FIG. 4 depicts an application for providing a single interface to multiple provisioning systems used in the arrangement of FIG. 2, according to an embodiment of the present invention.

FIG. 4 schematically illustrates an exemplary embodiment of the application that runs on computer system 202. The application 450 comprises a front-end interface 405 and a back-end interface 412 and communicates with communication configuration 414. The front-end interface 405 receives and displays information on a display 312 (FIG. 3), through a front-end program 400, such as a menu driven program or a graphical user interface (GUI), for example.

The front-end program 400 communicates with a front-end database 402, such as an ORACLE® or MICROSOFT ACCESS® database for example. The front-end database 402 is a central location for cellular telephone numbers from various service regions, along with information relating to those cellular telephone numbers, i.e., which cellular carrier owns each telephone number, different attributes of the telephone numbers, different markets the telephone numbers are in, etc. The front-end database 402 communicates with a database 404 containing mobile identification numbers (MINs) for subscribers' cellular telephones. The database 404 can be the same type of database as the front-end database 402, or may be a different type of database as long as the two databases can communicate with one another. Links or pointers, for example, associate MINs in database 404 with cellular telephone numbers in the front-end database 402. Although shown separately from the front-end database 402, the database 404 could be a part of database 402.

Several processes occur behind the front-end interface 405 that allow data transfers between A various provisioning systems 322 (FIG. 3) and the application 450. To facilitate data transfer from the front-end interface 405 and a particular provisioning system 322, a back-end interface 412 communicates with the front-end interface 405 and each provisioning system 322. The back-end interface 412 comprises scripts 406 that identify parameter sets required by each individual provisioning system, and a source of parameter sets, such as database 408 containing attributes about each carrier's provisioning system or systems. The scripts 406 also request and receive data from the front-end interface 405, and format data for a provisioning system 322. For each provisioning system 322 for each carrier, there is a corresponding script 406 that enables data transfers between the application 450, utilizing the communication configuration 414 for the provisioning system 322, and the provisioning system 322.

Each script 406 is written so that when a script 406 is executed by the computer system 202 (FIG. 2), the script 406 identifies a required provisioning parameter set for an action, i.e., activating a cellular telephone number or provisioning a feature for a cellular telephone number, performed by a particular provisioning system. Embodiments of the scripts 406 encompass a wide variety of similar programs and subroutines written in numerous languages. For example, scripts 406 can be written in JAVA to facilitate compiling and interpretation between the application 450 and the various communication configurations 414 for each of the provisioning systems 322. Other programming languages and techniques can be used to perform the functions of the scripts 406. For example, in place of JAVA scripts, agent programs that run in the background of the computer system 202, such as daemons on a UNIX system, could be utilized.

The scripts 406 populate the parameter fields in the identified parameter set with data from the front-end interface 405. Additionally, before populating data into the identified parameter set, a script 406 prompts the front-end interface 405 for the appropriate data. If the front-end interface 405 does not contain the appropriate data, a prompt is transmitted to the front-end program 400 and the data is input by a reseller representative. After receiving the appropriate data from the front-end interface 405, a script 406 formats the data into parameter data used by a particular provisioning system 322.

When a script 406 is executed by the computer system 202, the script 406 receives and uses the cellular carrier's identity as well as the subscriber's service region to determine which provisioning system 322 activates and/or provisions the cellular telephone number, which is also transmitted from the front-end interface 405. After determining the correct provisioning system 322, the script 406 identifies the required provisioning parameter set for that provisioning system 322. Once the provisioning parameters in the set are known, the script populates the parameter fields with data from the front-end interface 405. After the parameter fields have been populated the script 406 formats the data into provisioning data, then identifies the correct configuration 414 that establishes communication with the carrier's provisioning system 322. In FIG. 4, 414 designates all of the configurations that enable communication with a particular provisioning system. The number of configurations shown is not meant to limit the number of configurations in the present invention, but it is intended to illustrate that a plurality of configurations are utilized by the present invention. For each script 406, there is a specific configuration within the set of configurations 414 composed of software 410, hardware 318 (described in relation to FIG. 3), or a combination of software 410 and hardware 3 18, that enables communication between the application 450 and the particular provisioning system that the script 406 and specific configuration within 414 are compatible with. Not every configuration within 414 requires software 410, which facilitates communication between a script 406 and communication hardware 318 that the script 406 cannot communicate directly with. The script 406 then triggers the configuration within 414 to establish communication with the provisioning system 322, and transmits the formatted provisioning data and the cellular telephone number to the carrier's provisioning system 322.

The present invention has broad application to other scenarios involving resale of telecommunication services. One example involves number portability and resale of land-line telephone services from multiple telephone companies. Another example involves resale of paging services from multiple paging companies. The above detailed examples focus on resale of cellular telephone type services, but the invention applies equally to other emerging wireless data communication technologies.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed:

1. A product, comprising:
   a computer-readable medium; and
   instructions carried by the computer-readable medium, said instructions, when executed, being arranged to cause a computer system to process a provisioning request for a mobile telephone number utilizing a single interface by performing the steps of:
   receiving a provisioning request for a communications device into a single computer interface;
   determining a service region from a plurality of service regions in which provisioning will occur for the communications device after receiving the provisioning request for the communications device;
   identifying a telephone number from a plurality of telephone numbers based at least in part upon the determined service region;
   associating the identified telephone number with the communications device;

determining, from a plurality of carriers, a particular carrier that is associated with the identified telephone number;

identifying, from a plurality of provisioning parameter sets, a provisioning parameter set that is required by the particular carrier's provisioning system; creating provisioning data by supplying information from the provisioning request for the communications device to fill required provisioning parameter fields for the identified provisioning parameter set;

establishing communication with the particular carrier's provisioning system utilizing one corresponding configuration from among a plurality of configurations, where each configuration is adapted to enable communications with one, particular provisioning system; and sending the provisioning data to the particular carrier's provisioning system in accord with the one configuration to obtain implementation of the provisioning request for the communications device associated with the identified telephone number.

2. The product as in claim 1, wherein said instructions are further arranged to cause the computer system to perform the step of:

receiving notification indicating whether the identified telephone number has been provisioned, into the single computer interface from the particular carrier's provisioning system, utilizing the one configuration.

3. A product, comprising:

a computer-readable medium; and instructions carried by the computer-readable medium, said instructions, when executed, being arranged to cause a computer system to process a provisioning request for a telephone number utilizing a single interface by performing the steps of:

receiving a provisioning request for a communications device into a single computer interface;

determining a service region from a plurality of service regions in which provisioning will occur for the communications device after receiving the provisioning request for the communications device;

identifying a telephone number from a plurality of telephone numbers based at least in part upon the determined service region;

determining, from a plurality of carriers, a particular carrier that provides service for the identified telephone number;

identifying, from provisioning parameter sets for a plurality of carriers' provisioning systems, a provisioning parameter set that is required by a provisioning system of the particular carrier;

creating provisioning data by supplying information from the provisioning request for the communications device to fill required provisioning parameter fields for the identified provisioning parameter set;

establishing communication with the particular carrier's provisioning system utilizing one corresponding configuration from among a plurality of configurations, where each configuration is adapted to enable communications with one, particular provisioning system; and sending the provisioning data to the particular carrier's provisioning system in accord with the one configuration to provision service associated with the identified telephone number in accord with the request.

4. The product as in claim 3, wherein said instructions are further arranged to cause the computer system to perform the step of:

automatically provisioning at least a service with respect to the communications device associated with the identified telephone number via the particular carrier's provisioning system.

5. The product as in claim 3, wherein:

the communications device comprises a mobile communications device; and the telephone number comprises a mobile telephone number.

6. The product as in claim 3, wherein:

establishing communication with the particular carrier's provisioning system utilizing one corresponding configuration comprises utilization of hardware.

7. The product as in claim 6, wherein:

establishing communication with the particular carrier's provisioning system utilizing one corresponding configuration further comprises execution of software.

8. The product as in claim 3, wherein:

establishing communication with the particular carrier's provisioning system utilizing one corresponding configuration comprises execution of software.

9. The product as in claim 3, wherein:

identifying a required parameter set and creating provisioning data is performed by scripts executed by the computer.

10. The product as in claim 3, wherein:

at least a service that is automatically provisioned is activation for a new telephone number.

11. A system configured to provision telephone numbers belonging to multiple communications service providers comprising:

a computer;

a single interface running on the computer that receives and displays information for provisioning telephone numbers;

a database communicating with the interface comprising:
telephone numbers;
an identification of an associated service region for each telephone number;
an identification of an associated carrier for each telephone number from among a plurality of carriers; and
a set of required provisioning parameters for each carrier's provisioning system;

a plurality of configurations, each one adapted to enable communication with a distinct provisioning system for a carrier; and a plurality of scripts executed by the computer, each script communicating with the single interface and the database, wherein;
each script is written to identify, from a plurality of provisioning parameter sets, a required provisioning parameter set for a particular carrier's provisioning system;
each script utilizes the single interface, the database, and the required provisioning parameter set for the particular carrier's provisioning system to create provisioning data for a telephone number; and
each script triggers provisioning for a telephone number utilizing a predetermined one of the configurations adapted to enable communication with the particular provisioning system for a carrier.

12. The system of claim 11, wherein:

telephone numbers comprise mobile telephone numbers; and the identifications of the carriers comprise identifiers of mobile carriers.

13. The system of claim 11, wherein:

at least one of the configurations comprises hardware adapted to enable communication with a particular provisioning system.

14. The system of claim 11, wherein:

at least one of the configurations comprises software that is executable by the computer.

15. The system of claim 14, wherein:

at least one of the configurations further comprises software that is executable by the computer.

16. A method for provisioning telephone numbers belonging to multiple carriers utilizing a single computer interface, comprising the steps of:

receiving a provisioning request for a communications device into a single computer interface;

determining a service region from a plurality of service regions in which provisioning will occur for the communications device, after receiving the provisioning request for the communications device;

identifying a telephone number from a plurality of telephone numbers based at least in part upon the determined service region;

associating the identified telephone number with the communications device;

determining, from a plurality of carriers, a particular carrier that is associated with the identified telephone number;

identifying, from a plurality of provisioning parameter sets, a provisioning parameter set that is required by the particular carrier's provisioning system;

creating provisioning data by supplying information from the provisioning request for the communications device to fill required provisioning parameter fields for the identified provisioning parameter set;

establishing communication with the particular carrier's provisioning system utilizing one corresponding configuration from among a plurality of configurations, where each configuration is adapted to enable communications with one, particular provisioning system; and sending the provisioning data to the particular carrier's provisioning system in accord with the one configuration to obtain implementation of the provisioning request for the communications device associated with the identified telephone number.

17. The method of claim 16, further comprising the step of:

receiving notification indicating whether the identified telephone number has been provisioned, into the single computer interface from the particular carrier's provisioning system, utilizing the one configuration.

18. A method for provisioning telephone numbers belonging to multiple carriers utilizing a single computer interface, comprising the steps of:

receiving a provisioning request for a communications device into a single computer interface;

determining a service region from a plurality of service regions in which provisioning will occur for the communications device, after receiving the provisioning request for the communications device;

identifying a telephone number from a plurality of telephone numbers based at least in part upon the determined service region;

determining, from a plurality of carriers, a particular carrier that provides service for the identified telephone number;

identifying, from provisioning parameter sets for a plurality of carriers' provisioning systems, a provisioning parameter set that is required by a provisioning system of the particular carrier;

creating provisioning data by supplying information from the provisioning request for the communications device to fill required provisioning parameter fields for the identified provisioning parameter set;

establishing communication with the particular carrier's provisioning system utilizing one corresponding configuration from among a plurality of configurations, where each configuration is adapted to enable communications with one, particular provisioning system; and sending the provisioning data to the particular carrier's provisioning system in accord with the one configuration to provision service associated with the identified telephone number in accord with the request.

19. The method of claim 18, further comprising the step of:

automnatically provisioning at least a service with respect to the communications device, in association with the identified telephone number, via the particular carrier's provisioning system.

20. The method of claim 18, wherein:

the communications device comprises a mobile communications device; and the telephone number comprises a mobile telephone number.

21. The method of claim 18, wherein:

establishing communication with the particular carrier's provisioning system utilizing one corresponding configuration comprises utilization of hardware.

22. The method of claim 21, wherein:

establishing communication with the particular carrier's provisioning system utilizing one corresponding configuration further comprises execution of software.

23. The method of claim 18, wherein:

establishing communication with the particular carrier's provisioning system utilizing one corresponding configuration comprises execution of software.

24. The method of claim 18, wherein:

identifying a required parameter set and creating provisioning data are performed by scripts executed by the computer.

25. The method of claim 18, wherein:

the provisioning data relates to activation for a new telephone number.

* * * * *